G. B. DAMON.
METHOD OF AND APPARATUS FOR DRYING MATERIALS.
APPLICATION FILED AUG. 2, 1915.

1,222,079.

Patented Apr. 10, 1917.

INVENTOR-
G. B. Damon
BY
ATTORNEY.

UNITED STATES PATENT OFFICE.

GEORGE B. DAMON, OF BELVIDERE, NEW JERSEY, ASSIGNOR TO ALLIS-CHALMERS MANUFACTURING COMPANY, OF MILWAUKEE, WISCONSIN, A CORPORATION OF DELAWARE.

METHOD OF AND APPARATUS FOR DRYING MATERIALS.

1,222,079.   Specification of Letters Patent.   Patented Apr. 10, 1917.

Application filed August 2, 1915. Serial No. 43,703.

*To all whom it may concern:*

Be it known that I, GEORGE B. DAMON, a citizen of the United States, residing at Belvidere, in the county of Warren and State of New Jersey, have invented a certain new and useful Improvement in Methods of and Apparatus for Drying Materials, of which the following is a specification.

This invention relates to improvements in a method of and apparatus for drying materials such as pulverized rock, ore and like materials.

An object of the invention is to provide a simple and efficient method of drying materials. Another object is to provide a simple and efficient apparatus for carrying on the method. A further object is to provide a method of continuously drying material which will permit the use of drying apparatus of minimum size producing maximum output.

In the present method of drying, highly heated combustible gas is first utilized to preliminarily heat and partially dry the moist material, after which an oxidizing agent is mixed with the gas and the mixture is ignited and burned. The products of combustion resulting from such burning are then utilized to further heat and dry the material.

A clear conception of the various steps of the method and of one form of apparatus for carrying on the method may be had by referring to the following specification and the drawing accompanying and forming a part thereof, in which like reference characters designate the same or similar parts in the various views.

Figure 1:
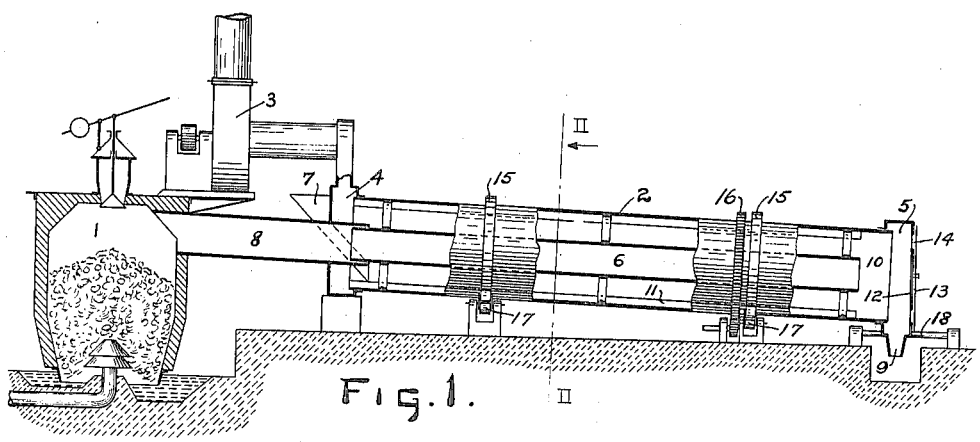
Figure 1 is a diagrammatic, part sectional elevation of a drier plant.
Figure 2:
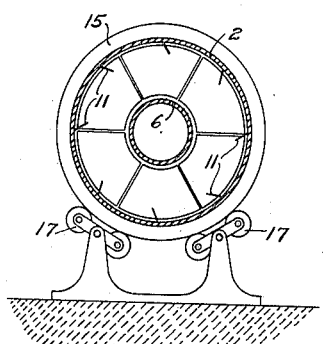
Fig. 2 is an enlarged transverse vertical section through the drier of the plant disclosed in Fig. 1, the section being taken along the line II—II of Fig. 1 looking in the direction of the arrow.
Figure 3:
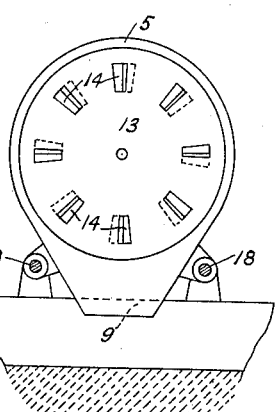
Fig. 3 is an enlarged end view of the drier of the plant disclosed in Fig. 1, looking at the material discharging end thereof.

The plant for carrying on the method, the subject of this invention, comprises essentially means for furnishing a continuous supply of hot combustible gas, and means for housing the material during the drying operation. The means for furnishing the continuous supply of hot combustible gas is disclosed herein as a continuous gas producer 1, which may be of any of the well known types. The means for housing the material during drying is disclosed as a drier comprising an outer rotatable inclined shell 2 forming a conduit, and a central pipe 6 carried by and forming a conduit within the outer shell 2.

The upper extremity of the inclined pipe 6 connects directly with the stationary gas feed pipe 8 which leads from the upper portion of the producer 1. The lower extremity of the inclined pipe 6 opens directly into the combustion chamber 10 formed at the lower end of the shell 2. The pipe 6 is secured centrally within the shell 2 by means of several sets of radial braces. The inner surface of the shell 2 is provided with a series of longitudinally extending agitating vanes or blades 11 which during rotation of the shell 2 lift the material and precipitate it through the annular space formed between the shell 2 and the pipe 6.

The shell 2 is provided with suitable tread wings 15 which engage bearing rollers 17. The shell 2 is rotatable by means of suitable driving gearing 16 of usual construction. A stationary gas discharge head 4 incloses the upper extremity of the inclined shell 2 and has its uppermost portion connected to a suction fan 3. The feed hopper 7 has a spout which penetrates the head 4 and delivers moist material into the annular space between the pipe 6 and the shell 2. A stationary dry material discharge head 5 incloses the lower extremity of the inclined shell 2 and forms part of the wall of the combustion chamber 10. The discharge head 5 is adjustably supported upon stationary supporting rods 18 and has a downwardly directed discharge opening 9.

The vertical end wall 12 of the head 5 has an angularly adjustable plate 13 secured thereto. The plate 13 and end wall 12 are provided with alinable openings 14 for admitting variable quantities of air or other oxidizing agent to the combustion chamber 10.

During the normal operation of the apparatus, the producer is placed in operation in the usual manner and furnishes a continuous supply of heated combustible gas to the pipe 8 and central pipe 6. The shell 2 and pipe 6 are rotated by means of the driving gearing 16, and the material which is to be dried is fed continuously through the hopper 7 and into the space between the shell 2 and the pipe 6. Due to the inclination of the rotating shell 2, and also due to the lifting and subsequent precipitation of the material by the blades 11, the material is gradually fed along the interior of the shell 2 and toward the discharge head 5.

The gas admitted to the pipe 6 from the producer 1 is drawn downwardly through the central pipe by the suction produced by the fan 3. As the combustible gas leaves the lower extremity of the pipe 6 and enters the combustion chamber 10, it is mixed with a predetermined quantity of air sufficient to produce complete combustion and is automatically ignited. The highly heated products of combustion produced by the burning of the gas, are drawn upwardly by the fan 3, through the annular space between the shell 2 and pipe 6, thus coming into direct contact with the material passing downwardly through the shell 2. The gases of combustion after entering the end of the head 4, are withdrawn and discharged by the fan 3.

It will thus be seen that the material passing downwardly through the shell 2 is preliminarily indirectly heated and partially dried by the hot combustible gas passing from the producer 1 to the combustion chamber 10 through the pipe 6, after which the material is subsequently directly heated and further dried by the hot products of combustion passing from the chamber 10 to the end head 4. As the gases during combustion are expanded enormously, it will be noted that the cross-sectional area of the pipe 6 as compared to that of the annular chamber surrounding the pipe may be relatively small. Both the cross sectional area of the pipe 6 and the area of the annular chamber surrounding the pipe may be made considerably smaller than they would be in a drier operating under the present well known methods. The enormous heat generated during combustion also produces temperatures in the chamber surrounding the pipe 6 which will effectively drive off and substantially completely dry the material passing therethrough. By means of the relatively adjustable plates 12, 13, and of the alinable openings 14, the amount of air or other oxidizing agent admitted to the chamber 10 may be readily regulated to meet any desired conditions of operation.

It should be understood that it is not desired to limit the present invention to the exact steps of the process described or to the exact details of construction of the apparatus shown and described, for obvious modifications may occur to a person skilled in the art.

It is claimed and desired to secure by Letters Patent:

1. The method of drying material which comprises, utilizing heated combustible gas derived from a source independent of the material to heat the material, and burning said gas and further heating the material with the products of combustion.

2. The method of drying material which comprises, utilizing heated combustible gas to indirectly heat the material, and subsequently burning said gas and directly additionally heating the material with the products of combustion.

3. The method of drying material which comprises, passing the material through a conduit, producing a flow of heated combustible gas derived from a source independent of the material along the material to heat the same, and burning said gas and further heating the material with the products of combustion.

4. The method of drying material which comprises, passing the material through an inclosed conduit, producing a continuous flow of heated combustible gas through said conduit to preliminarily heat said material, burning the gas and passing the products of combustion along the material to further heat the same.

5. In combination, means for furnishing a continuous supply of hot combustible gas, means for conveying said gas in proximity to the material to be dried, means for producing combustion of said gas, and means for conveying the products of combustion along the material.

In testimony whereof, the signature of the inventor is affixed hereto.

GEORGE B. DAMON.